(12) United States Patent
Doyen

(10) Patent No.: US 6,296,378 B1
(45) Date of Patent: Oct. 2, 2001

(54) POSITION LIGHT FOR AIRCRAFT

(75) Inventor: Fred W. Doyen, Grand Prairie, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 0 days.

(21) Appl. No.: 09/338,069

(22) Filed: Jun. 23, 1999

(51) Int. Cl.⁷ .................................................. B64D 47/04
(52) U.S. Cl. ............................................ 362/470; 362/390
(58) Field of Search ................................... 362/282, 322, 362/470, 471, 472, 390; 340/982, 981; 244/118.1, 118.5

(56) References Cited

U.S. PATENT DOCUMENTS

| | | | |
|---|---|---|---|
| 2,719,282 | * | 9/1955 | Roth ........................................ 340/982 |
| 2,832,059 | * | 4/1958 | Adler, Jr. ................................ 340/982 |
| 3,102,993 | * | 9/1963 | Jensen ..................................... 362/470 |
| 3,270,193 | * | 8/1966 | Peterson ................................. 362/470 |

* cited by examiner

*Primary Examiner*—Y. Quach
(74) *Attorney, Agent, or Firm*—James E. Walton; Hill & Hunn, LLP

(57) ABSTRACT

A position light for use on an aircraft, the position light having a base member coupled to the wing tip portion, a lens coupled to the base member, a light source interior to the lens member, and a reflector member pivotally coupled to the base member, the reflector member being adapted to reflect light from the light source in selected directions and at selected intensities. The position light may be installed on a tilt rotor assembly of a tilt rotor aircraft so that light is reflected in selected directions and at selected intensities, regardless of whether the tilt rotor assembly is in an airplane mode, a helicopter mode, or any position therebetween.

30 Claims, 7 Drawing Sheets

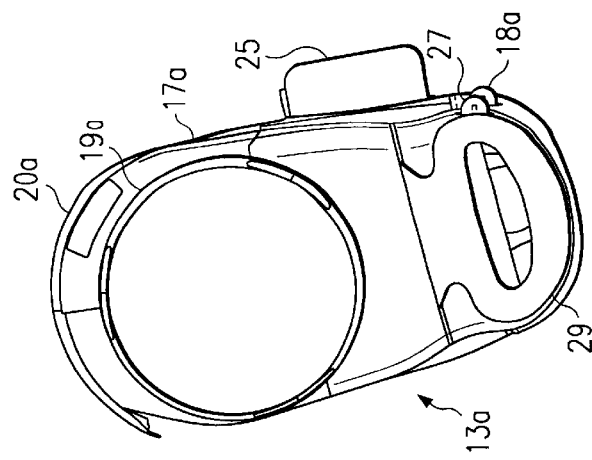
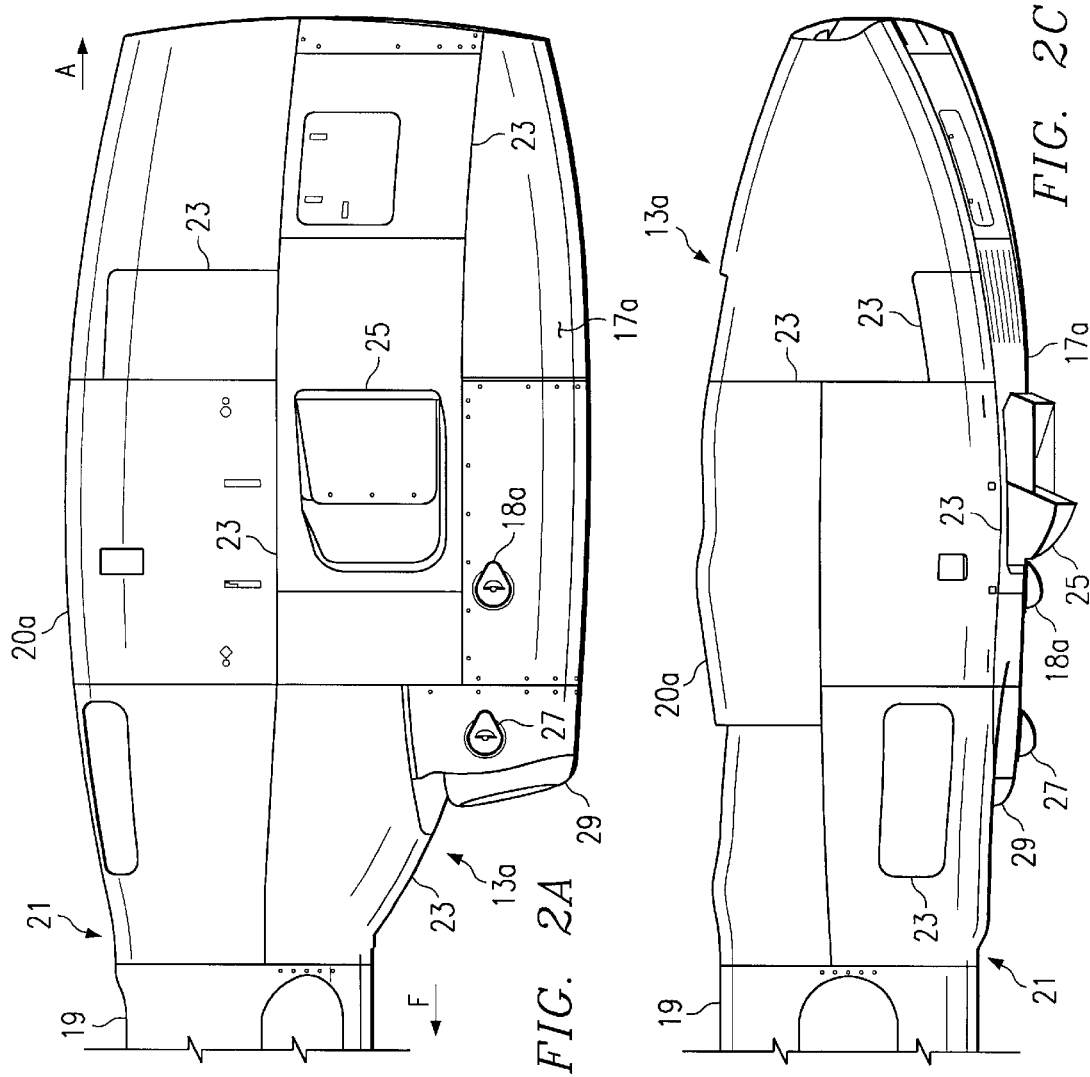
FIG. 2B
FIG. 2A
FIG. 2C

| DIHEDRAL ANGLE (LIGHT INCLUDED) | ANGLE ABOVE OR BELOW A HORIZONTAL PLANE | INTENSITY (CANDLES) |
|---|---|---|
| N/A | 0° | 1.00 * I |
| F4 (FORWARD RED AND GREEN) | 0° TO 5° | 0.90 * I |
| F5 (FORWARD RED AND GREEN) | 5° TO 10° | 0.80 * I |
| F6 (FORWARD RED AND GREEN) | 10° TO 15° | 0.70 * I |
| F7 (FORWARD RED AND GREEN) | 15° TO 20° | 0.50 * I |
| F8 (FORWARD RED AND GREEN) | 20° TO 30° | 0.30 * I |
| F9 (FORWARD RED AND GREEN) | 30° TO 40° | 0.10 * I |
| F10 (FORWARD RED AND GREEN) | 40° TO 90° | 0.05 * I |

*FIG. 5A*

| OVERLAPS | MAXIMUM INTENSITY AREA A (CANDLES) | MAXIMUM INTENSITY AREA B (CANDLES) |
|---|---|---|
| FORWARD GREEN IN DIHEDRAL ANGLE L | 10 | 1 |
| FORWARD RED IN DIHEDRAL ANGLE R | 10 | 1 |
| FORWARD GREEN IN DIHEDRAL ANGLE A | 5 | 1 |
| FORWARD RED IN DIHEDRAL ANGLE A | 5 | 1 |
| REAR WHITE IN DIHEDRAL ANGLE L | 5 | 1 |
| REAR WHITE IN DIHEDRAL ANGLE R | 5 | 1 |

*FIG. 7*

POSITION LIGHT FOR AIRCRAFT

BACKGROUND ART

1. Field of the Invention

The present invention relates generally to position lights for aircraft. More particularly, the present invention relates to a position light with a pivotable reflector for use on a tilt rotor aircraft.

2. Description of Related Art

In order for an aircraft to be certified by the United States Federal Aviation Administration, the aircraft must meet certain requirements set forth in the Federal Aviation Regulations ("FAR") of the United States Code of Federal Regulations. The FAR require that position lights meeting certain color, intensity, and viewing angle specifications be installed on all aircraft. For example: 14 C.F.R. §29.1387 defines various dihedral angles through which position lights must show unbroken light; and 14 C.F.R. §§29.1389, 29.1391, 29.1393, 29.1395 set forth the specific light distribution and intensity requirements for position lights. Because fixed-wing aircraft and helicopters use position lights that are fixed, they have little difficulty meeting the position-light standards. However, tilt rotor aircraft cannot use fixed position lights because when the tilt rotor assemblies tilt from helicopter mode to airplane mode the reflective angles and intensities of the position light change and no longer meet the required specifications.

Although several alternatives are available for placement of position lights on tilt rotor aircraft, none of the solutions adequately rectify the problem. For example, the use of a rotating position light is not an acceptable answer to the problem, because the rotating position light must be mounted through the nacelle of the tilt rotor to the wing structure. The use of multiple position lights is unacceptable because of the added weight and complexity. Additional parts are required, including automatic on/off switching of the light sources. Simply mounting the position light at a different location on the tilt rotor aircraft does not work because this violates the viewing requirements.

There is a need for a position light for use on a tilt rotor aircraft that is capable of meeting the stringent color, intensity, and viewing angle requirements while in both airplane and helicopter mode.

BRIEF SUMMARY OF THE INVENTION

There is a need for a position light for use on an aircraft that is capable of radiating light at selected angles and at selected intensities relative to a horizontal plane, such as the earth's surface, independent of the orientation of the aircraft's plane of travel. There is also a need for a position light for use on a tilt rotor aircraft that can maintain specific color, intensity, and viewing angle requirements in both the airplane mode and the helicopter mode.

It is an object of the present invention to provide a position light for an aircraft that is capable of radiating light at selected angles and at selected intensities relative to a horizontal plane, such as the earth's surface, independent of the orientation of the aircraft's plane of travel.

It is an object of the present invention to provide a tilt rotor aircraft having position lights that meet certain color, intensity, and viewing angle specifications in both the airplane mode and the helicopter mode.

It is another object of the present invention to provide an aircraft position light with a pivotable reflector.

It is another object of the present invention to provide a forward position light for mounting to a nacelle of a tilt rotor on a tilt rotor aircraft such that the position light continuously maintains certain color, intensity, and viewing angle settings.

It is another object of the present invention to provide a position light for aircraft having components that move relative to the aircraft's airframe, such as vectored thrust aircraft.

The above, as well as, additional objectives, features, and advantages of the present invention will become apparent in the following detailed description and accompanying drawings.

BRIEF DESCRIPTION OF THE DRAWINGS

FIG. 2A is a partial side view of a left side tilt rotor assembly of a typical tilt rotor aircraft.

FIG. 2B is a front view of the tilt rotor assembly of FIG. 2A.

FIG. 2C is a partial top view of the tilt rotor assembly of FIG. 2A.

FIG. 5A is a table of minimum intensities in any vertical plane of forward position lights according to FAR.

FIG. 7 is a table of maximum intensities in overlapping beams of forward position lights according to FAR.

DETAILED DESCRIPTION OF THE PREFERRED EMBODIMENT

Figure 1A:
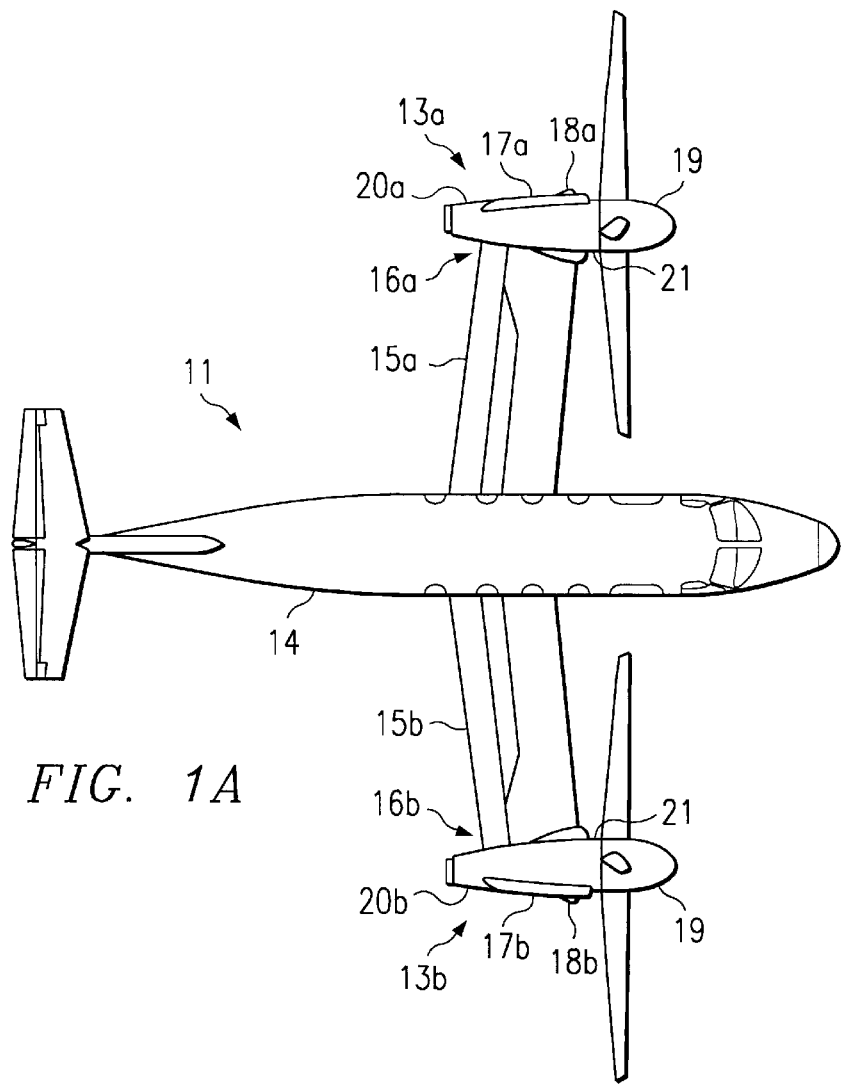
FIG. 1A is a top view of a tilt rotor aircraft having a position light according to the present invention, the tilt rotor aircraft being in an aircraft mode.
Figure 1B:
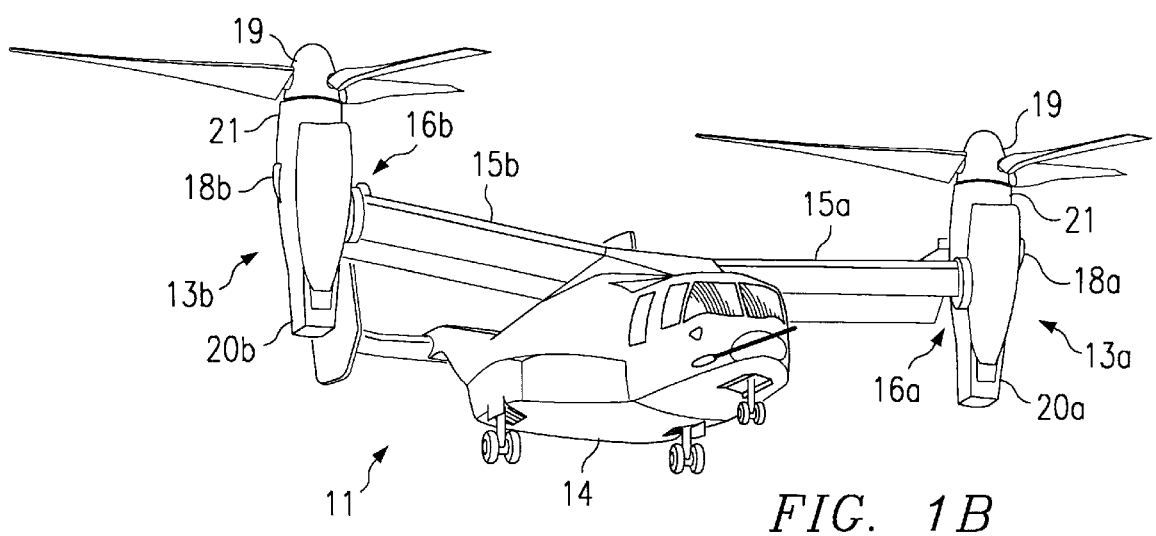
FIG. 1B is a perspective view of a tilt rotor aircraft having a position light according to the present invention, the tilt rotor aircraft being in a helicopter mode.

Referring to FIGS. 1A and 1B in the drawings, the preferred embodiment of an improved aircraft 11 according to the present invention is illustrated. In particular, aircraft 11 is represented as a tilt rotor aircraft. As is conventional with tilt rotor aircraft, rotor assemblies 13a and 13b are carried by wings 15a and 15b, and are disposed at end portions 16a and 16b of wings 15a and 15b, respectively. End portions 16a and 16b, in this case tilt rotor assemblies 13a and 13b, move or rotate relative to wing members 15a and 15b. In the case of tilt rotor aircraft, tilt rotor assemblies 13a and 13b rotate between a helicopter mode in which tilt rotor assemblies 13a and 13b are tilted upward, such that tilt rotor aircraft 11 flies like a conventional helicopter; and an aircraft mode in which tilt rotor assemblies 13a and 13b are tilted forward, such that tilt rotor aircraft 11 flies like a conventional propeller driven aircraft. In FIG. 1A, tilt rotor aircraft 11 is shown in the aircraft mode; and in FIG. 1B, tilt rotor aircraft 11 is shown in the helicopter mode. As shown in FIGS. 1A and 1B, wings 15a and 15b are coupled to an airframe 14. Although the present invention will be discussed herein with respect to tilt rotor aircraft 11, it should be understood that the present invention may be used with any aircraft on which it would be desirable to have pivotable position lights according to the present invention, including unmanned aerial vehicles, any aircraft in which the wings have end portions that are movable relative to the wings, or any aircraft having components that move relative to the airframe, such as vectored thrust aircraft.

Each rotor assembly 13a and 13b includes at least one position light 18a and 18b located on outboard sides 17a and 17b of protective nacelles 20a and 20b that cover tilt rotor assemblies 13a and 13b, respectively. Position lights 18a and 18b are disposed on tilt rotor assemblies 13a and 13b so as to function as forward position lights. It should be understood that position lights 18a and 18b may be located at various locations on aircraft 11, depending upon the desired directions from which position lights 18a and 18b are to be viewed.

Referring now to FIGS. 2A–2C in the drawings, tilt rotor assembly 13a is illustrated in a partial side view, a front view, and a partial top view, respectively. In FIG. 2A, arrow F indicates a generally horizontal forward direction, and arrow A indicates an opposite aft direction. Thus, tilt rotor assembly 13a is in the airplane mode with a rotor hub 19 on a forward end 21 of tilt rotor assembly 13a. Nacelles 20a and 20b are usually made of aluminum or a composite material, and are constructed of a plurality of panels, such as panels 23. Panels 23 serve a variety of functions, such as allowing access to internal components, including mechanical systems, hydraulic systems, and electrical control systems. For example, one such panel 23 includes an exhaust port 25. Because position lights 18a and 18b take up little or no space within the interior of tilt rotor assemblies 13a and 13b, position lights 18a and 18b can be installed onto tilt rotor assemblies 13a and 13b at a variety of locations, provided that position lights 18a and 18b meet certain required color, intensity, and viewing angle specifications set forth by the FAR. For example, position light 27 is identical to position light 18a, but is located in a more forward position near an air intake 29. As will be explained in more detail below, it is necessary that there be no obstructions to the required color, intensity, or viewing angle of position lights 18a and 18b, regardless of whether tilt rotor assemblies 13a and 13b are in the airplane mode, the helicopter mode, or any position therebetween. For example, it would not be possible for position light 18a to be installed directly above exhausts ports 25, because exhausts ports 25 would block the view of position light 18a from the forward position when tilt rotor assembly 13a is in the helicopter mode.

Figure 3B:
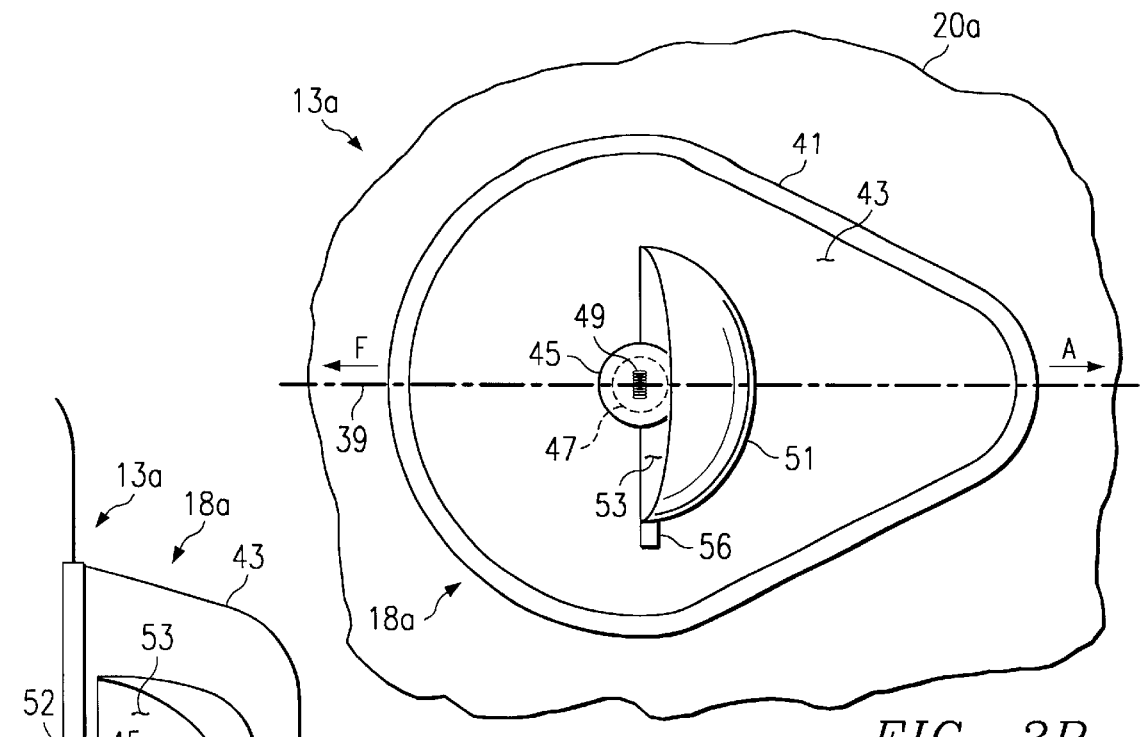
FIG. 3B is a side view of the position light of FIG. 3A.
Figure 3A:
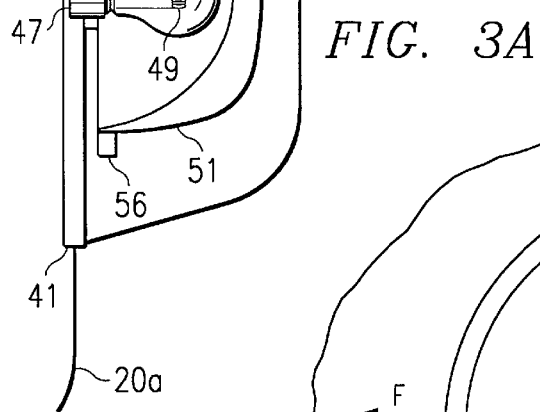
FIG. 3A is a front view of a position light according to the present invention, the position light being in the airplane mode.
Figure 3C:
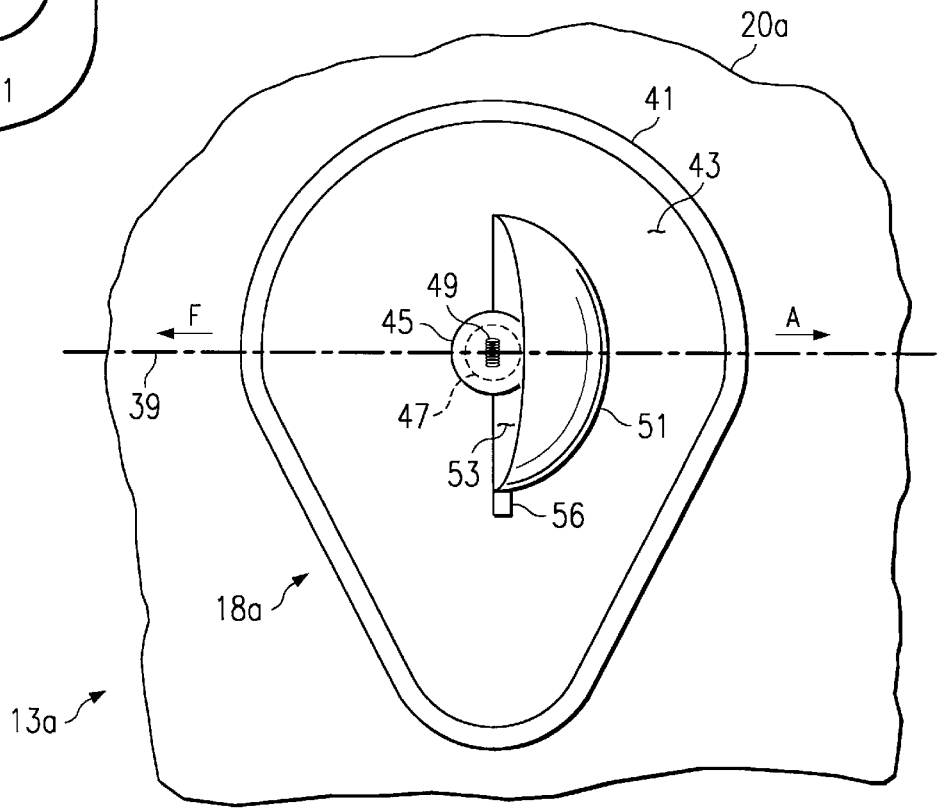
FIG. 3C is a side view of the position light of FIG. 3A, the position light being in the helicopter mode.

Referring now to FIGS. 3A–3C in the drawings, position light 18a according to the present invention is illustrated installed on nacelle 20a of tilt rotor assembly 13a. As shown in FIGS. 3B and 3C, a longitudinal axis 39 lies in a generally horizontal plane parallel to forward direction F and aft direction A. Thus, in FIG. 3B, rotor assembly 13a is in the airplane mode; and, in FIG. 3C, rotor assembly 13a is in the helicopter mode. Position light 18a has a base assembly 41 that is adapted to be coupled to nacelle 20a of tilt rotor assembly 13a. Base assembly 41 is coupled to nacelle 20a by conventional means, such as clamps, screws, or rivets, such that base assembly 41 does not move relative to nacelle 20a. A lens cover 43 is sealingly coupled to base assembly 41. Lens cover 43 is preferably made of a transparent material, such as glass or plastic, but may be made of any other material used for lens covers. Lens cover 43 does not move relative to base assembly 41. A light source 45 is electrically coupled to a light source mounting assembly 47. Light source 45 is preferably a 28-Volt, 75-Watt, 2.68-Amp light bulb having a filament 49. Light source mounting assembly 47 is electrically coupled to a conventional power source (not shown), preferably a power source of tilt rotor aircraft 11.

Lens cover 43 may be selectively colored such that light from light source 45 is seen as the selected color, such as red, green, or white. For example, FAR require that a position light on the left hand side of an aircraft be red, that a position light on the right hand side of an aircraft be green, and that rear facing position lights be white. It should be understood that lens cover 43 may include certain conventional texturing or other surface features, such as ridges, bumps, or other patterns, to enhance reflectivity of position light 18a. Such conventional surface treatment of lens cover 43 may be used to reflect light from light source 45 in selected directions and at selected intensities.

A generally concave elliptical reflector member 51 is coupled to base assembly 41 via a low friction attachment member 52. Low friction attachment member 52 is preferably a precision bearing assembly. Because nacelle 20a is typically an environment of high vibration, low friction attachment member 52 may include certain vibration isolation means, or damping means, such as viscous fluid dampers, electromechanical dampers, electromagnetic dampers, or mechanical dampers, including detents at selected angles. Reflector member 51 partially surrounds light source 45 such that a focal point is created at filament 49. The concave interior surface of reflector member 51 forms a reflective surface 53. Reflector surface 53 reflects light from light source 45 at selected angles and at selected intensities. Reflective surface 53 is made of material commonly used for reflective surfaces, such as mirrored glass or highly polished metal. The exact shape of reflector member 51 and reflective surface may be determined and adapted by well known rules of physics and optics in order to reflect the light from light source 45 in selected directions and at selected intensities. It is preferred that reflector member 51 also prevents light from being reflected in selected directions; however, lens cover 43 may contribute to the prevention of light from being reflected in certain directions. The same is true for the prevention or minimizing of overlap of light beams in selected directions.

Reflector member 51 is adapted to pivot about a reflector pivot axis 54. At least one counter-rotation means 56 may be coupled to a lower end of reflector member 51 to aid in maintaining reflector member 51 in a fixed position relative to a horizontal surface, such as the surface of the earth, independent of the orientation of aircraft 11. Preferably, counter-rotation means 56 is a fixed counterweight, such as bolt having a selected weight. Thus, counter-rotation means 56 may be coupled to reflector member 51 via a tab (not shown). Alternatively, counter-rotation means 56 may be movable about reflector member 51, such that reflector member 51 reflects light at selected angles and selected intensities relative to other planes besides a horizontal plane. In addition, counter reflector pivot axis 54 may pass through light source 45, but is not required to do so. However, reflector member 51 and low friction attachment member 52 are configured such that reflector pivot axis 54 remains horizontal, and generally parallel with the surface of the earth regardless of the orientation of tilt rotor assembly 13a.

Figure 6:
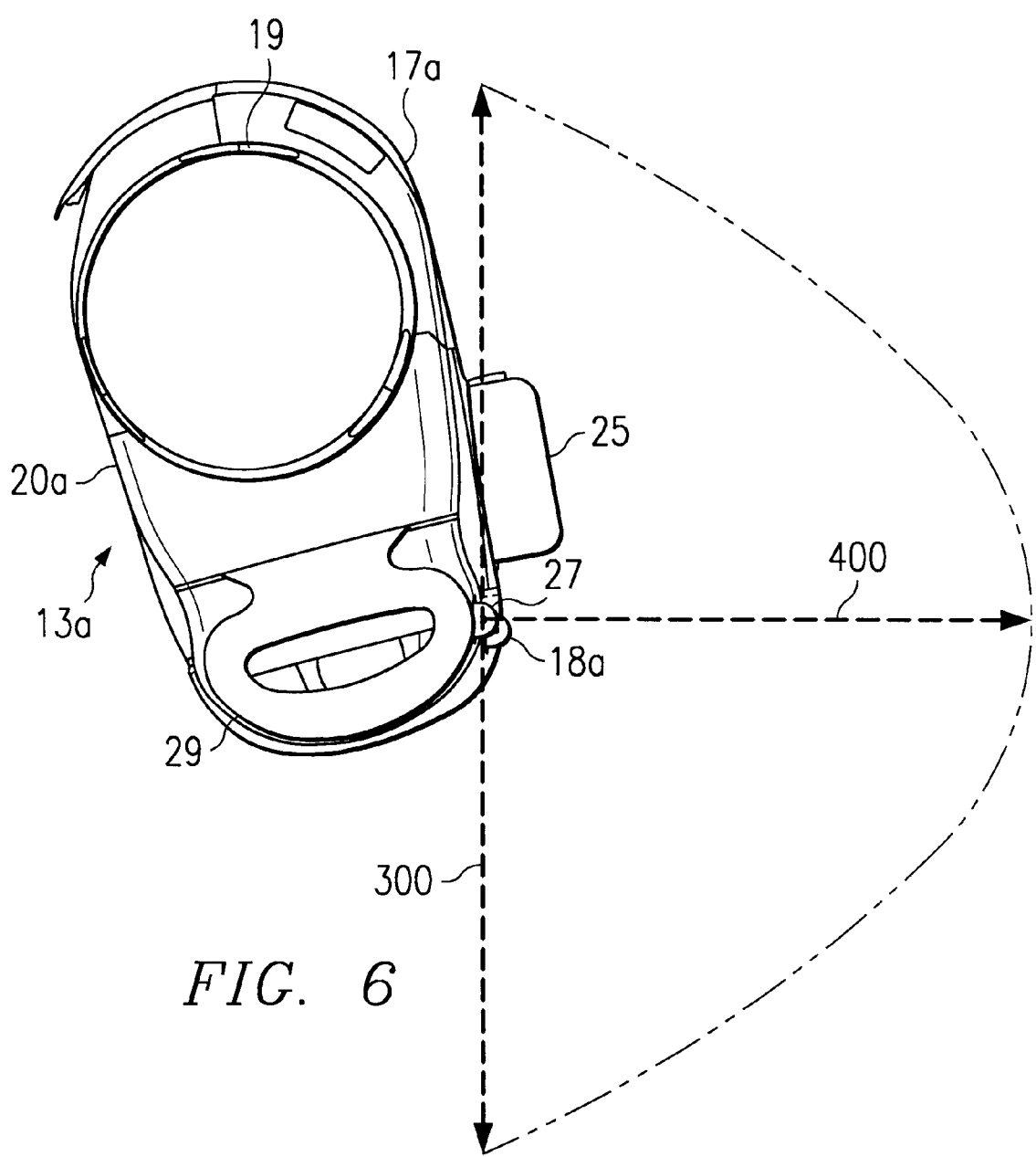
FIG. 6 is the front view of the tilt rotor assembly of FIG. 2B, with the addition of directional reference vectors.

This is best seen in FIG. 6. Although reflector member 51 is illustrated with only a single low friction attachment member, it should be understood that a second low friction attachment member (not shown) may be located along reflector pivot axis 54 should additional support be desired. Thus, as base assembly 41, lens cover 43, and light source 45 rotate with tilt rotor assembly 13a from the airplane mode to the helicopter mode, and vice versa, reflector member 51 maintains stationary relative to longitudinal axis 39, focal point, or filament 49, and reflector pivot axis 54; thereby continuously reflecting the light from light source 45 at the selected angles and the selected intensities. In this manner, selected color, intensity, and viewing angle specifications, such as those required by FAR, for position lights 18a and 18b are maintained, regardless of the position of tilt rotor assemblies 13a and 13b.

As illustrated in FIGS. 3B and 3C, base assembly 41 and lens cover 43 of position light 18a are in the shape of a teardrop having a length-to-width ratio of about 2-to-1. It should be understood that the external shape of position light 18a may vary without affecting the functionality of pivotable reflector member 51. Base assembly 41 and lens cover 43 of position light 18a may be circular in shape or have a length-to-width ratio of about 3-to-1. For example, a position light 18a having a generally circular shape may be necessary for applications in which installation space is limited; however, it is commonly known that teardrop shapes are more aerodynamic and produce less drag. In any event, the shape of position light 18a may be modified to accommodate placement in a variety of locations on nacelle 20a without affecting the performance of position light 18a.

Figures 4A, 4B:
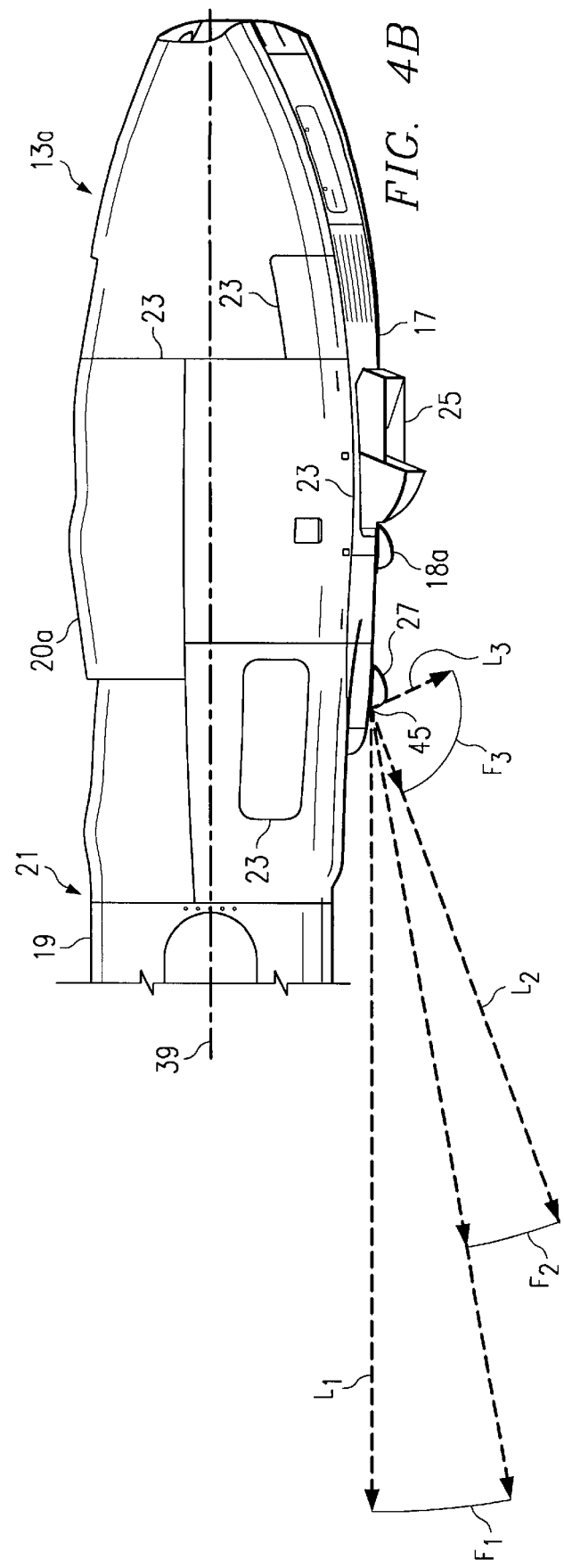
FIG. 4A is a table of minimum intensities in the horizontal plane of forward position lights according to FAR.
FIG. 4B is the partial top view of the tilt rotor assembly of FIG. 2C, with the addition of intensity vectors representing the data in the table of FIG. 4A.

Referring now to FIG. 4A in the drawings, a table 100 of minimum intensities in the horizontal plane of forward and rear position lights is provided. Table 100 corresponds with 14 C.F.R. §29.1391. In table 100, dihedral angles F1, F2, and F3 are formed by the intersection at a position light of a vertical plane parallel to longitudinal axis 39 and a vertical plane of light from the position light, measured from straight ahead. As set forth in table 100, dihedral angles F1, F2, and F3 from 0° to 110° are considered forward. For dihedral angles F1 in the range of 0° to 10°, the intensity of forward position lights, both left red and right green, must be at least 40 candles. For dihedral angles F2 in the range of 10° to 20°, the intensity of forward position lights, both left red and right green, must be at least 30 candles. Finally, for dihedral angles F3 in the range of 20° to 110°, the intensity of forward position lights, both left red and right green, must be at least 5 candles.

Referring now to FIG. 4B in the drawings, a top view of tilt rotor assembly 13a, similar to FIG. 2C, is illustrated. Light from position light 27 is represented as vectors L1, L2, and L3. Dihedral angles F1, F2, and F3 correspond to dihedral angles F1, F2, and F3 of table 100. Vector L1 represents an intensity of light from position light 27 of 40 candles. Vector L1 is constant through dihedral angle F1 which represents 0° to 10°, as measured from straight ahead. Vector L2 represents an intensity of light from position light 27 of 30 candles. Vector L2 is constant through dihedral angle F2 which represents 10° to 20°, as measured from straight ahead. Vector L3 represents an intensity of light from position light 27 of 5 candles. Vector L3 is constant through dihedral angle F3 which represents 20° to 110°, as measured from straight ahead. Although representative dihedral angles and light vectors are not shown for tilt rotor assembly 13b, such are indicated in table 100, and would be a mirror image of FIG. 4B about a central axis of tilt rotor aircraft 11.

Referring now to FIG. 5A in the drawings, a table 200 of minimum intensities in any vertical plane of forward and rear position lights is provided. Table 200 corresponds with 14 C.F.R. §29.1393. In table 200, dihedral angles F4–F10 are formed by the intersection at a position light of a horizontal plane parallel to a longitudinal axis and an inclined plane of light from the position light, measured from straight ahead. As set forth in table 200, dihedral angles F4–F10 range from 0° to 90° both above and below the horizontal plane, and are considered forward. Light in the horizontal plane, i.e., a dihedral angle of 0°, must be at least 1.00 times the required intensity "I" in the vertical plane. The intensity "I" is obtained from the "Intensity" column of table 100 in FIG. 4A. For dihedral angles F4 in the range of 0° to 5°, the intensity of forward position lights, both left red and right green, must be at least 0.90 times "I" candles. For dihedral angles F5 in the range of 5° to 10°, the intensity of forward position lights, both left red and right green, must be at least 0.80 times "I" candles. For dihedral angles F6 in the range of 10° to 15°, the intensity of forward position lights, both left red and right green, must be at least 0.70 times "I" candles. For dihedral angles F7 in the range of 15° to 20°, the intensity of forward position lights, both left red and right green, must be at least 0.50 times "I" candles. For dihedral angles F8 in the range of 20° to 30°, the intensity of forward position lights, both left red and right green, must be at least 0.30 times "I" candles. For dihedral angles F9 in the range of 30° to 40°, the intensity of forward position lights, both left red and right green, must be at least 0.10 times "I" candles. Finally, for dihedral angles F10 in the range of 40° to 90°, the intensity of forward position lights, both left red and right green, must be at least 0.05 times "I" candles.

Figure 5B:
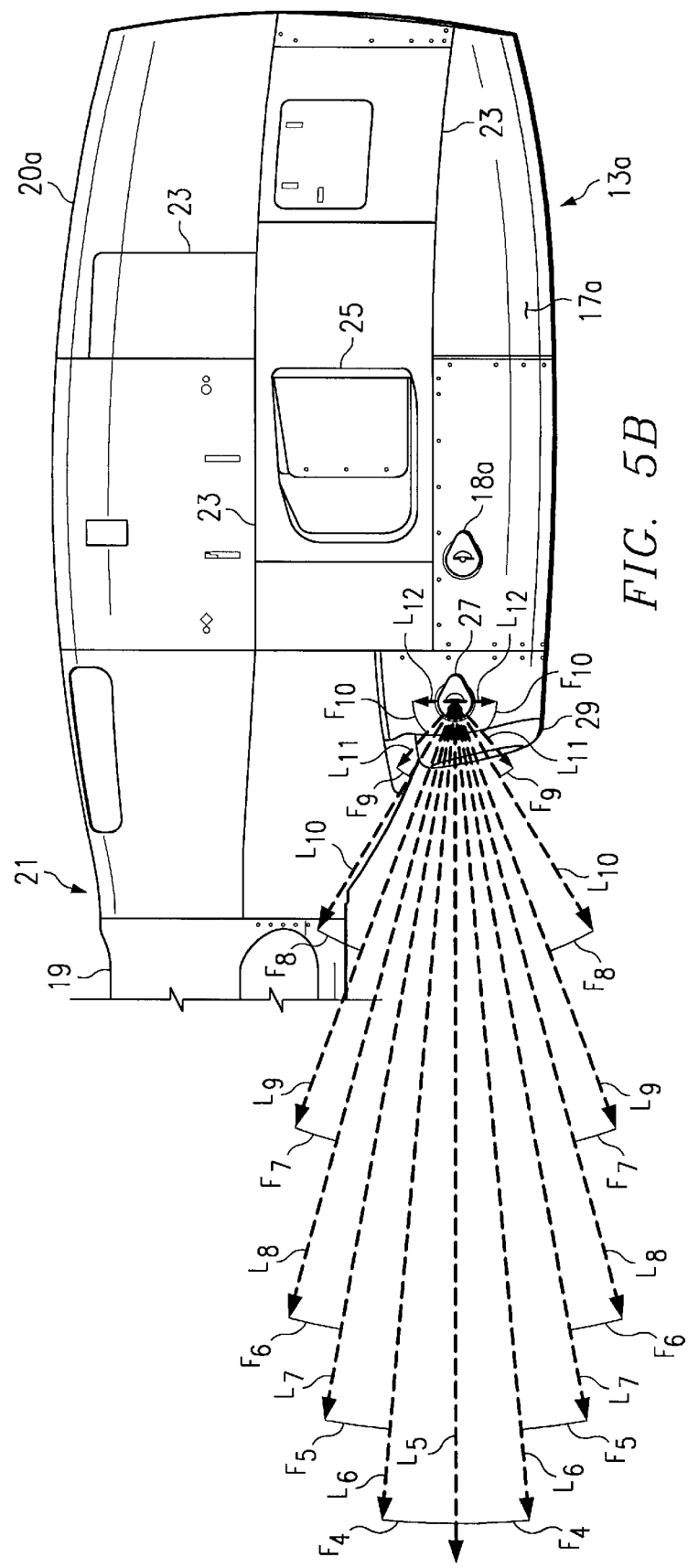
FIG. 5B is the partial side view of the left side tilt rotor assembly of FIG. 2A, with the addition of intensity vectors representing the data in the table of FIG. 5A.

Referring now to FIG. 5B in the drawings, a side view of tilt rotor assembly 13a, similar to FIG. 2A, is illustrated. Light from position light 27 is represented as vectors L5–L12. Dihedral angles F4–F10 correspond to dihedral angles F4–F10 of table 200. Vector L5 represents an intensity of light from position light 27 of 1.00 times "I" candles. Vector L5 is only at a horizontal dihedral angle of 0°. Vector L6 represents an intensity of light from position light 27 of 0.90 times "I" candles. Vector L6 is constant through dihedral angles F4 in the range of 0° to 5°, as measured above and below the horizontal. Vector L7 represents an intensity of light from position light 27 of 0.80 times "I" candles. Vector L7 is constant through dihedral angles F5 in the range of 5° to 10°, as measured above and below the horizontal. Vector L8 represents an intensity of light from position light 27 of 0.70 times "I" candles. Vector L8 is constant through dihedral angles F6 in the range of 10° to 15°, as measured above and below the horizontal. Vector L9 represents an intensity of light from position light 27 of 0.50 times "I" candles. Vector L9 is constant through dihedral angles F7 in the range of 15° to 20°, as measured above and below horizontal. Vector L10 represents an intensity of light from position light 27 of 0.30 times "I" candles. Vector L10 is constant through dihedral angles F8 in the range of 20° to 30°, as measured above and below the horizontal. Vector L11 represents an intensity of light from position light 27 of 0.10 times "I" candles. Vector L11 is constant through dihedral angles F9 in the range of 30° to 40°, as measured above and below the horizontal. Vector L12 represents an intensity of light from position light 27 of 0.05 times "I" candles. Vector L12 is constant through dihedral angles F10 in the range of 40° to 90°, as measured above and below horizontal.

Referring now to FIG. 6 in the drawings, a front view of tilt rotor assembly 13a, similar to FIG. 2B, is illustrated. A vertical vector 300 and a horizontal vector 400 are provided to show the coverage of position light 27 relative to the operating orientation of tilt rotor assembly 13*a* in the airplane mode. Vertical vector 300 and horizontal vector 400 generally correspond to the planes that form the dihedral angles in FIGS. 4B and 4B. It should be apparent that vertical vector 300 and horizontal vector 400 are provided merely to show the continuous coverage required by the FAR, and are not intended to serve as to-scale intensity vectors.

Referring now to FIG. 7 in the drawings, a table 500 of maximum intensities in overlapping beams of forward and rear position lights is provided. Table 500 corresponds with 14 C.F.R. §29.1395. The FAR require that, in general, no position light intensity may exceed the applicable values in table 500. In table 500, Area A includes all directions in the adjacent dihedral angle that pass through the light source and intersect the common boundary plane at more than 10° but less than 20°; and Area B includes all directions in the adjacent dihedral angle that pass through the light source and intersect the common boundary plane at more than 10°.

In summary, according to applicable FAR, the minimum intensity of both red and green forward position lights as viewed from straight ahead is 40 candles; and the maximum intensity of both red and green forward position lights as viewed from the rear of the aircraft is 0 candles. The FAR cited and referred to herein have been used to illustrate how the present invention is capable of performing to current certification standards, and are not intended to be inclusive of all rules and regulations pertaining to all types of position lights for all types of aircraft. It should be apparent that the position light according to the present invention may be easily adapted to comply with a variety of standards and specifications.

It should be apparent from the foregoing that an invention having significant advantages has been provided. While the invention is shown in a limited number of forms, it is not limited to just these forms, but is susceptible to various changes and modifications without departing from the spirit thereof.

What is claimed is:

1. An improved aircraft comprising:
   an airframe;
   at least one wing member coupled to the airframe, the at least one wing member having a wing tip portion; and
   at least one position light disposed on the wing tip portion, the at least one position light comprising:
      a base member coupled to the wing tip portion;
      a lens member coupled to the base member;
      a light source interior to the lens member; and
      a reflector member pivotally coupled to the base member, the reflector member being adapted to reflect light from the light source in selected directions and at selected non-oscillating light intensities regardless of the orientation of the wing tip portion.

2. The improved aircraft according to claim 1, wherein the wing tip portion is movable relative to the at least one wing member.

3. The improved aircraft according to claim 1, wherein the wing tip portion is a tilt rotor assembly.

4. The improved aircraft according to claim 1, wherein the wing tip portion rotates relative to the airframe.

5. The improved aircraft according to claim 1, wherein the at least one position light further comprises:
   a vibration damping member coupled to the at least one position light to ensure that the reflector member reflects the light from the light source in the selected directions.

6. The improved aircraft according to claim 1, wherein the at least one position light is a forward position light.

7. The improved aircraft according to claim 6, wherein the at least one wing member is a left wing member, and the lens member is colored red.

8. The improved aircraft according to claim 6, wherein the at least one wing member is a right wing member, and the lens member is colored green.

9. The improved aircraft according to claim 1, wherein the selected directions and the selected intensities are pre-selected.

10. The improved aircraft according to claim 1, wherein the at least one position light further comprises:
    at least one counter-rotation means coupled to the reflector member to oppose rotational movement of the reflector member.

11. The improved aircraft according to claim 10, wherein the at least one counter-rotation means is at least one counterweight member coupled to the reflector member.

12. The improved aircraft according to claim 10, wherein the at least one counter-rotational means is at least one detent for partially restricting the rotation of the reflector member.

13. A position light for an aircraft, the position light comprising:
    a base member coupled to the aircraft;
    a lens member coupled to the base member;
    a light source interior to the lens member; and
    a reflector member pivotally coupled to the base member, the reflector member being adapted to reflect light from the light source in selected directions and at selected non-oscillating light intensities regardless of the orientation of the aircraft.

14. The position light according to claim 13, wherein the aircraft is a tilt rotor aircraft, and the base member is coupled to an outboard surface of a nacelle for covering a tilt rotor assembly.

15. The position light according to claim 13, wherein the position light further comprises:
    a vibration damping member coupled to the base member to ensure that the reflector member reflects the light from the light source in the selected direction.

16. The position light according to claim 15, wherein the vibration damping member is a mechanical damping device.

17. The position light according to claim 15, wherein the vibration damping member is a viscous fluid damping device.

18. The position light according to claim 15, wherein the vibration damping member is an electromechanical damping device.

19. The position light according to claim 15, wherein the vibration damping member is an electromagnetic damping device.

20. The position light according to claim 13, wherein the position light is coupled to the aircraft such that the position light is visible from a forward position relative to the aircraft.

21. The position light according to claim 20, wherein the position light is coupled to a right side of the aircraft, and the lens member is colored green.

22. The position light according to claim 21, wherein the selected directions and selected intensities comprise:
    a regulated intensity;
    regulated first dihedral angles defined by vertical planes that intersect at the reflector member with a vertical plane parallel to a longitudinal axis of the aircraft, as measured to the right from straight ahead; and regulated second dihedral angles defined by inclined planes that intersect at the reflector member with a horizontal plane, as measured above and below the horizontal plane from straight ahead;

the regulated intensity being at least 40 candles in all directions in the regulated first dihedral angles being in the range of about 0° to 10°;

the regulated intensity being at least 30 candles in all directions in the regulated first dihedral angles being in the range of about 10° to 20°;

the regulated intensity being at least 5 candles in all directions in the regulated first dihedral angles being in the range of about 20° to 110°;

an intensity of at least 1.00 times the regulated intensity in all directions in the horizontal plane;

an intensity of at least 0.90 times the regulated intensity in all directions in the regulated second dihedral angles being in the range of about 0° to 5°;

an intensity of at least 0.80 times the regulated intensity in all directions in the regulated second dihedral angles being in the range of about 5° to 10°;

an intensity of at least 0.70 times the regulated intensity in all directions in the regulated second dihedral angles being in the range of about 10° to 15°;

an intensity of at least 0.50 times the regulated intensity in all directions in the regulated second dihedral angles being in the range of about 15° to 20°;

an intensity of at least 0.30 times the regulated intensity in all directions in the regulated second dihedral angles being in the range of about 20° to 30°;

an intensity of at least 0.10 times the regulated intensity in all directions in the regulated second dihedral angles being in the range of about 30° to 40°; and an intensity of at least 0.05 times the regulated intensity in all directions in the regulated second dihedral angles being in the range of about 40° to 90°.

23. The position light according to claim 20, wherein the position light is coupled to a left side of the aircraft, and the lens member is colored red.

24. The position light according to claim 23, wherein the selected directions and selected intensities comprise:

a regulated intensity;

regulated first dihedral angles defined by vertical planes that intersect at the reflector member with a vertical plane parallel to a longitudinal axis of the aircraft, as measured to the left from straight ahead; and regulated second dihedral angles defined by inclined planes that intersect at the reflector member with a horizontal plane, as measured above and below the horizontal plane from straight ahead;

the regulated intensity being at least 40 candles in all directions in the regulated first dihedral angles being in the range of about 0° to 10°;

the regulated intensity being at least 30 candles in all directions in the regulated first dihedral angles being in the range of about 10° to 10°;

the regulated intensity being at least 5 candles in all directions in the regulated first dihedral angles being in the range of about 20° to 110°;

an intensity of at least 1.00 times the regulated intensity in all directions in the horizontal plane;

an intensity of at least 0.90 times the regulated intensity in all directions in the regulated second dihedral angles being in the range of about 0° to 5°;

an intensity of at least 0.80 times the regulated intensity in all directions in the regulated second dihedral angles being in the range of about 5° to 10°;

an intensity of at least 0.70 times the regulated intensity in all directions in the regulated second dihedral angles being in the range of about 10° to 15°;

an intensity of at least 0.50 times the regulated intensity in all directions in the regulated second dihedral angles being in the range of about 15° to 20°;

an intensity of at least 0.30 times the regulated intensity in all directions in the regulated second dihedral angles being in the range of about 20° to 30°;

an intensity of at least 0.10 times the regulated intensity in all directions in the regulated second dihedral angles being in the range of about 30° to 40°; and an intensity of at least 0.05 times the regulated intensity in all directions in the regulated second dihedral angles being in the range of about 40° to 90°.

25. The position light according to claim 13, wherein the selected directions and the selected intensities are preselected.

26. An improved aircraft comprising:

an airframe;

at least one airframe component disposed exterior to the airframe, the airframe component being movable relative to the airframe and having a wing tip portion; and at least one position light disposed on the airframe component, the at least one position light comprising:
a base member coupled to the wing tip portion;
a lens member coupled to the base member;
a light source interior to the lens member; and
a reflector member pivotally coupled to the base member, the reflector member being adapted to reflect light from the light source in selected directions and at selected intensities.

27. The improved aircraft according to claim 26, wherein the at least one position light further comprises:

a counter-rotation means coupled to the reflector member for preventing rotation of the reflector member.

28. The improved aircraft according to claim 27, wherein the counter-rotation means is movable relative to the reflector member.

29. A method of converting an aircraft into an improved aircraft having position lights that reflect light in selected directions and at selected non-iscillating light intensities independently of an orientation of the improved aircraft, the method comprising the steps of:

providing at least one position light having a reflector member pivotally coupled to a base member, the reflector member reflecting light from a light source;

mounting the at least one position light to the existing aircraft such that the at least one position light having the relfector member will reflect the light from the light source in the selected directions and at the selected non-oscillating light intensities regardless of the orientation of the aircraft.

30. The method according to claim 29, wherein the step of providing at least one position light having a reflector member pivotally coupled to a base member further comprises the steps of:

providing at least one counter-rotation means associated with the reflector member for resisting rotation of the reflector member with the base member.

* * * * *